United States Patent Office 3,430,049
Patented Feb. 25, 1969

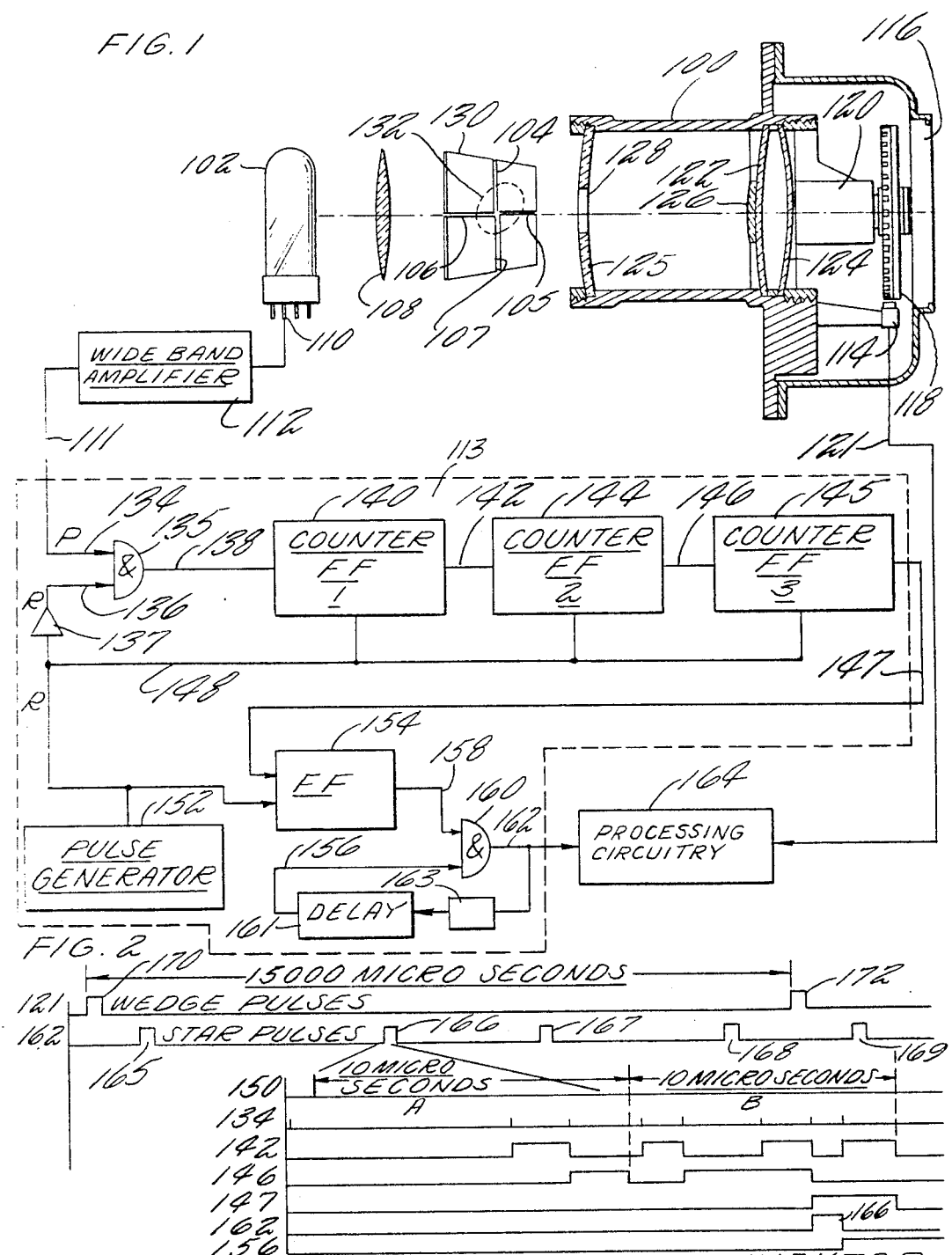

3,430,049
PRECISE TIME CONTROL FOR A STAR ANGLE SENSOR
John V. Hughes, Ansdell, England, assignor to United Aircraft Corporation, East Hartford, Conn., a corporation of Delaware
Filed Apr. 15, 1965, Ser. No. 448,447
U.S. Cl. 250—203                4 Claims
Int. Cl. G01j 1/24

This invention relates to an improved electro-optical light sensor for observing the relative position of a source of light. More specifically, this invention relates to an electro-optical star angle sensor utilizing a digital filter.

In my copending patent application Ser. No. 135,339, filed Aug. 31, 1961, entitled "Star Angle Sensor" and assigned to the same assignee now U.S. Patent No. 3,242,795, I disclose a star angle sensor capable of measuring the deviation of the starlight from a known optical axis of the sensor and reference may be had thereto for a more detailed description.

Many guidance and control systems for aircraft and missile applications utilize light position sensors for navigation and attitude control. Such light sensors when sufficiently sensitive are easily adapted to provide a means for accurately determining the orientation of a star relative to the sensor optical axis. Diversity and usefulness of such light angle sensors will be much enhanced by improving the ability of sensing low intensity light. The sensitivity of the sensor is a function of many factors, such as the aperture, the field of view, the transmissibility of the optics, background noise and spectrum incompatibilities between the source of light and the detector used for transforming the light into an electrical signal. All of these factors affect the energy level of the light incident upon the detector and its ability to convert the light to a useful electrical signal. It is therefore an object of this invention to improve the sensitivity of a light sensor.

Another object of this invention is to improve the sensitivity of a sensor in the detection of light intensity variations.

A further object of this invention is to improve the sensitivity of a star angle sensor and improve the speed of the sensor's responses to starlight.

Although the sensor hereinafter described is particularly useful in detecting the visible spectrum of light, it is to be recognized that energy having a different spectral distribution such as in the infrared or ultraviolet regions may be used with this type of sensor where the detector transducing the energy received into an electrical signal produces pulsed outputs. The term light therefore includes to this extent these other radiant energies.

Pertinent features of the star sensor described in my aforementioned patent are referred to herein to facilitate understanding the novelty of the improvement of this invention. The star angle sensor produces a rotating focussed spot image of the star located in its field of view by means of a rotating wedge and associated telescopic optics. The rotating image traverses transparent slits cut into an opaque reticle which is located in the image plane.

The slits have a predetermined orientation with respect to the pitch, yaw and roll axes of the vehicle in which the sensor is mounted. The photon sensitive device for transducing the starlight to an electrical signal is positioned behind the slits and responds to the light pulses generated as the rotating spot image traverses a slit. The photon device is therefore exposed to intensity modulated light and its resulting output electrical signal may be used to provide the star angle information.

From the theory known about photon sensitive devices (i.e., photomultiplier tubes) it can be shown that such a detector produces a known statistical number of output pulses in response to a particular input light energy level. These pulses are related to individual photons striking the cathode surface. The frequency of these pulses increases with increasing light intensity and decreases with decreasing light intensity. Nevertheless, the frequency of the pulses arising from weak starlight is noticeably higher than the frequency of the pulses attributed to dark current noise. For instance, light from a +3 magnitude star may produce $3 \times 10^5$ pulses per second and the dark current pulse frequency may be about $10^3$ pulses per second. There is noise present from other sources such as background and optics but these may be controlled to tolerably low levels during most of the time. It is therefore still another object of this invention to improve the light pulse detection of a star angle sensor with a digital filter.

Although the star angle sensor utilizes a rotating wedge for causing the image to traverse the transparent slits in the reticle other means for doing so may be employed. For instance, the sensor as a whole may be nutated in a controllable manner similar to the nutation of antenna feeds in tracking radar devices. Rotational motion is not essential and linear, or any controlled motion may suffice.

In the drawings:
FIG. 1 illustrates a schematic of the star angle sensor of this invention including a block diagram of the digital filter.
FIG. 2 illustrates the timing relationship between the various pulses generated by the digital filter.

Referring to FIG. 1 a star angle sensor 100 is shown as the image receiving device. The light energy received is transmitted through the slits 104, 106 in the reticle 130 and then to photomultiplier 102. The particular use of the slits is described in detail hereinafter. The light passing through the slits is focussed on a cathode (not shown) of the photomultiplier 102.

A distinguishing feature of photomultiplier tubes is that their output is actually a series of many small pulses. The rate at which these pulses appear depends upon the magnitude of the incident radiation striking the cathode. For example, if this radiation is very strong, these discrete pulses occur in rapid succession, approaching a D.C. voltage. However, if the impinging light source is of a weak magnitude, i.e., starlight, the occurrence is slower, and individual pulses can be measured at the output of the tube. Specifically, in sensitive photomultiplier tubes, an electron is released for every light quantum that strikes the cathode. For every electron released, secondary emission in the tube adds additional electrons until the output may contain as many as $5^{14}$ electrons. This large number of electrons represents a measurable pulse.

The output of the photomultiplier is conducted via pin 110 to the wideband amplifier 112 for power amplification and impedance matching. The amplifier 112 may be a common double emitter follower and is generally known to those skilled in the art. The output of amplifier 112 is transmitted by a suitable conductor 111 to the digital filter generally indicated by 113. The term "digital filter" is intended to convey the thought that the circuit so named, selects and counts by digital means, specific groups of pulses. When the digital filter 113 senses the occurrence of a starlight pulse in the manner described below, a star pulse signal is transmitted to the star angle sensor processing circuitry 164 which may be of the type as described in my aforementioned patent. The main function of the processing circuitry is to determine the orientation of the star relative to the optical axis of the star angle sensor.

The photomultiplier tube 102 may be one such as is commonly available as the 1P21. The spectral response of such a tube coincides to an acceptable degree with the light spectrum generated by stars ordinarily sensed by the star angle sensor 100.

The star angle sensor 100 may be of the kind disclosed in my aforementioned patent. A summary of its construction and operation is set forth below. The sensor uses a compact telescope comprising a folded catadioptric system having all spherical surfaces of the Maksutov-Cassegrain type. The light from a star passes through the wide plane lens 116 and through a rotatable transparent wedge 118 driven by motor 120. The light passes from the wedge 118 through the meniscus lenses 122 and 124 for optical correction and is incident upon the concave primary focussing mirror 125. The mirror 125 reflects the light on reflecting mirror 126 which is attached to the convex surface of lens 122. The light reflected from mirror 126 is passed through a hole 128 in the mirror 125 to be focussed on a flat opaque reticle having narrow transparent slits 104 and 106. The reticle 130 is shown in perspective as being spaced from mirror 125 for clarity but normally is located immediately adjacent to the mirror 125. The focussed light spot on reticle 130 traverses a circuitous path 132 as a result of the rotation of the wedge 118.

The diameter of the path 132 is a function of the angle of wedge 118 and the focal length of the star angle sensor. A typical diameter may be 18 millimeters and the spot size, depending upon the quality of the optics, may range from 2 to 200 microns in diameter. The center of the circle, however, will be offset from the intersection of the slits depending upon and corresponding to the degree of angle formed between the optical axis of the star sensor and the light from the star in the field of view.

Since the speed of the wedge rotation is known, the time required for the light spot to travel from one slit to the next can be used to determine the orientation of the observed star relative to the optical axis of the star sensor. This type of angle detection scheme is described in my aforementioned patent.

The starlight image traversing the slit is approximately .02 mm. wide and the slit may be .25 mm. wide. With wedge speeds of 4000 r.p.m. producing an image circle, 132, having an 18 mm. diameter, the time for the light spot to traverse the slit is approximately 70 microseconds. In view of the varying spot image size, the time may vary considerably and be as large as 300 microseconds. The delay associated with this relatively long traverse time directly affects the accuracy in the measurement of the star angle. It is therefore essential that the time when the light spot crosses a slit be consistently measured. This is the problem to which the present invention is particularly directed.

The crossing may be defined in several ways, i.e., when the light spot enters, leaves, or crosses the center of the slit. In the embodiment of this invention, the crossing is defined by counting four pulses from the photomultiplier after the light spot first impinges upon the edge of the slit.

The construction of the digital filter according to the improvement of the present invention is shown in FIG. 1 in combination with the other star angle sensor components. The output of the wideband amplifier 112 is fed to the digital filter generally indicated by numeral 113. The filter consists of the double input AND gate 135 which has its output connected to the input of the counter formed by three flip-flops 140, 144, and 145. The AND gate and the flip-flops are circuits of conventional design. The counter flip-flops 140, 144 and 145 as well as flip-flop 154 have a common reset pulse channel 148 for establishing a known initial condition. The reset pulse (R) occurs about every 10 microseconds and is about a half a microsecond long. The pulse is produced by a conventional pulse generator 152. During the occurrence of an R pulse the AND gate 135 is disabled by its input 136. Input 136 represents the NOT R pulse as a result of the inversion by the conventional inverter 137.

The output of the counter is selected on the basis of the criteria used for detecting the presence of a light pulse. In this embodiment the output 147 of the counter represents a count of four which must occur within the 10 microsecond period set by the pulse generator R pulses. The output 147 is connected to a star pulse recognition flip-flop 154 which provides an enabling input to the AND gate 160 when the counter output 147 indicates a count of four. The output of the digital filter is a timing signal appearing on conductor 162.

FIG. 2 shows the timing relationships between the star pulses and the time domain of the digital filter. Line 121 shows the occurrence of the wedge pulses 170 and 172 generated by the magnetic pickup 114 each time the wedge completes a full revolution. For a wedge rotation of 4000 r.p.m. the approximate duration between wedge pulses is 15,000 microseconds. As is indicated in my aforementioned patent the purpose of the wedge pulse is to aid in relating the star pulses 165, 166, 167, 168 and 169 to the individual slits 104, 105, 106 and 107.

The operation of the digital filter is more easily observed in the expanded time scale portion of FIGURE 2. The time it takes the light spot to completely enter a transparent slit is considered to be approximately 5 microseconds. The repetitive pulses from pulse generator 152 occurring at 10 microsecond intervals are illustrated on line 150. These pulses are used to reset flip-flops 140, 144 and 145, thereby enabling these flip-flops to begin a new count every 10 microseconds. Two exemplary 10 microsecond intervals (A and B) are shown. During interval A, the light spot indicated by any one of the star pulses on line 162 commences to enter the slit. For purposes of explanation, two different size light spots are considered in this interval. First, a light spot image of .02 millimeter will take approximately 5 microseconds to completely enter the slit. FIGURE 2, line 134 shows that only two pulses can be detected in the last 5 microseconds of interval A. These two pulses are not enough to achieve the desired high count before the counter is reset at the end of the 10 microsecond interval. Because only two pulses appear at the output 110 of photomultiplier 102, and wideband amplifier 112 during interval A, flip-flop 154 will not change state and the counter will be reset by the next reset pulse. On the other hand, for a smaller diameter spot of 20 microns, a half a microsecond would be needed for the spot to entirely enter the slit. In this case, four pulses would be counted during the first 10 microsecond period indicated at interval A.

During interval B, regardless of the spot size, the intensity of the spot and the fact that it will, by this time, have completely entered the slit, results in the occurrence of at least four pulses at output 110. This condition is indicated in line 134, interval B. By carefully picking the size of the light spot in conjunction with a suitable pulse rate from generator 152, a preselected count can be obtained from the counter in some definite time under 20 microseconds for each slit crossing. Thus, the digital filter accurately defines the various times that the light spot crosses slits 104–107, and this specific time is defined at the same point for each slit crossing. During interval B, $\overline{R}$ (not R) is active on input 136 to AND gate 135. AND gate 135 is enabled and passes the pulses to counter flip-flop 140.

The counter pulses are shown at lines 142, 146 and 147. When 147 shows active, which is equivalent to a count of 4, recognition flip-flop 154 is activated and produces an enabling input to AND gate 160.

The other input 156 to AND gate 160 is obtained from delay 161. This delay is of a type commonly available in the computer field. Its function is to disable the AND gate 160 for a short period once the occurrence of a star pulse has been detected by the digital counter. Since the delay 161 should not go into effect until the star pulse processing circuitry has received a pulse, the delay 161 is in turn delayed somewhat by the shorter delay 163. The delay 161 is necessary because the star spot image may take as much as 70 microseconds to cross a slit and the inhibiting delay output 156 should prevail as long as that to prevent subsequent output pulses from the same spot-slit transition to produce more than one star pulse. The delay 163 need be but several microseconds long and could be dispensed with by changing flip-flop 154 to a single pulse generator whose trailing edge is used to activate the delay 161 and whose leading edge would activate the processing circuitry.

Thus, it can be seen that in this embodiment the occurrence of a star pulse is detected by monitoring the photon-electron counts during regularly recurring intervals. The intervals may be varied to accommodate varying light intensities and photon multipliers as well as other optical arrangements. The embodiment of FIG. 1 shows a digital filter for detecting the passage of the star spot image from the dark to the transparent area.

The embodiment herein described is directed at devices where the variation of intensity of the source of light is produced artificially by the movement of a rotating wedge. It should be recognized, however, that the digital filtering can also be performed where the source of light itself has a varying intensity. In the latter instance a wedge is not needed to practice this invention.

Although the invention has been described and illustrated in detail, it is to be clearly understood that the same is by way of illustration and example only and is not to be taken by way of limitation of the scope of the invention.

I claim:
1. A start angle sensor comprising:
   electro-optical means for producing a series of measurable pulse groups occurring at spaced intervals, the intervals between pulse groups defining the star angle;
   timing means responsive to each of said pulse groups in turn to generate a timing signal at a time for each one of said pulse groups which bears the same relation to the start of pulses in said one pulse group as for groups adjacent to said one pulse group in said series;
   and processing circuitry responsive to said timing signals to measure the angle between the optical axis of the sensor and the line of sight of the star.

2. A star angle sensor according to claim 1 wherein said timing means comprises:
   means for counting individual pulses of each one of said pulse groups, said counting means generating a count signal indicative of a predetermined count;
   and output means responsive to said predetermined count signal for generating said timing signal.

3. A device as recited in claim 2 wherein said timing means further comprises:
   a generator producing repetitive pulses;
   and input gating means responsive to said pulse groups and said repetitive pulses for passing said pulse groups in the presence of said repetitive pulses.

4. A star angle sensor according to claim 2 wherein said output means comprises:
   an output gating means having a first input responsive to said count signal and having an output to produce said timing signal;
   and a delay circuit responsive to said timing signal and electrically connected to a second input of said output gating means to inhibit said output gating means for a predetermined time after an initial count has been made in a particular pulse group, thereby limiting the output of said timing means to one timing signal for each pulse group.

References Cited

UNITED STATES PATENTS

| | | | |
|---|---|---|---|
| 2,999,939 | 9/1961 | Bible et al. | 250—203 |
| 2,999,944 | 9/1961 | Laycak | 250—219 |
| 3,242,795 | 3/1966 | Hughes | 88—1 |

ARCHIE R. BORCHELT, *Primary Examiner.*

MARTIN ABRAMSON, *Assistant Examiner.*